(12) United States Patent
Shuster

(10) Patent No.: US 12,169,892 B2
(45) Date of Patent: Dec. 17, 2024

(54) TIME-DEPENDENT CLIENT INACTIVITY INDICIA IN A MULTI-USER ANIMATION ENVIRONMENT

(71) Applicant: PFAQUTRUMA RESEARCH LLC, Wilmington, DE (US)

(72) Inventor: Brian Mark Shuster, Vancouver (CA)

(73) Assignee: PFAQUTRUMA RESEARCH LLC, Wilmington, DE (US)

( * ) Notice: Subject to any disclaimer, the term of this patent is extended or adjusted under 35 U.S.C. 154(b) by 0 days.

(21) Appl. No.: 18/594,690

(22) Filed: Mar. 4, 2024

(65) Prior Publication Data
US 2024/0378787 A1    Nov. 14, 2024

Related U.S. Application Data

(63) Continuation of application No. 18/144,323, filed on May 8, 2023, now Pat. No. 11,948,239, which is a
(Continued)

(51) Int. Cl.
*G06T 17/00* (2006.01)
*A63F 13/30* (2014.01)
(Continued)

(52) U.S. Cl.
CPC .............. *G06T 13/40* (2013.01); *A63F 13/30* (2014.09); *A63F 13/50* (2014.09); *A63F 13/52* (2014.09); *G06F 3/04815* (2013.01); *G06F 3/04845* (2013.01); *G06T 17/00* (2013.01); *G06T 19/003* (2013.01); *G06T 19/006* (2013.01); *A63F 2300/5553* (2013.01); *A63F 2300/638* (2013.01); *A63F 2300/6653* (2013.01); *G06T 2210/36* (2013.01); *G06T 2210/62* (2013.01)

(58) Field of Classification Search
None
See application file for complete search history.

(56) References Cited

U.S. PATENT DOCUMENTS 6,091,410 A    7/2000 Lection et al.
6,219,045 B1    4/2001 Leahy et al.
(Continued)

FOREIGN PATENT DOCUMENTS

WO    2008109798    9/2008

OTHER PUBLICATIONS

Vincent E. Harron, Roger Uzun, David Taylor and John Buckley; "Interactive Multi-Player Game"; U.S. Appl. No. 60/189,845, filed Mar. 16, 2000; 1019 pages.

*Primary Examiner* — Robert J Craddock
(74) *Attorney, Agent, or Firm* — Fernando & Partners, LLP

(57) ABSTRACT

A method for managing a multi-user animation platform is disclosed. A three-dimensional space within a computer memory is modeled. An avatar of a client is located within the three-dimensional space, the avatar being graphically represented by a three-dimensional figure within the three-dimensional space. The avatar is responsive to client input commands, and the three-dimensional figure includes a graphical representation of client activity. The client input commands are monitored to determine client activity. The graphical representation of client activity is then altered according to an inactivity scheme when client input commands are not detected. Following a predetermined period of client inactivity, the inactivity scheme varies non-repetitively with time.

20 Claims, 3 Drawing Sheets

Related U.S. Application Data continuation of application No. 17/841,534, filed on Jun. 15, 2022, now Pat. No. 11,688,118, which is a continuation of application No. 17/223,204, filed on Apr. 6, 2021, now Pat. No. 11,443,472, which is a continuation of application No. 16/857,664, filed on Apr. 24, 2020, now Pat. No. 10,997,767, which is a continuation of application No. 16/160,959, filed on Oct. 15, 2018, now Pat. No. 10,672,172, which is a continuation of application No. 15/012,159, filed on Feb. 1, 2016, now Pat. No. 10,102,661, which is a continuation of application No. 13/286,045, filed on Oct. 31, 2011, now Pat. No. 9,251,616, which is a continuation of application No. 11/928,584, filed on Oct. 30, 2007, now Pat. No. 8,049,756.

(51) Int. Cl.

| | |
|---|---|
| *A63F 13/50* | (2014.01) |
| *A63F 13/52* | (2014.01) |
| *G06F 3/04815* | (2022.01) |
| *G06F 3/04845* | (2022.01) |
| *G06T 13/40* | (2011.01) |
| *G06T 19/00* | (2011.01) |

(56) References Cited

U.S. PATENT DOCUMENTS

| | | |
|---|---|---|
| 6,329,994 B1 | 12/2001 | Gever et al. |
| 6,381,444 B1 | 4/2002 | Aggarwal et al. |
| 6,734,885 B1 | 5/2004 | Matsuda |
| 6,767,287 B1 | 7/2004 | McQuaid et al. |
| 6,784,901 B1 | 8/2004 | Harvey et al. |
| 7,468,729 B1 | 12/2008 | Levinson |
| 2001/0051989 A1 | 12/2001 | Moncreiff |
| 2002/0062348 A1 | 5/2002 | Maehiro |
| 2003/0039945 A1 | 2/2003 | Dang et al. |
| 2003/0083922 A1 | 5/2003 | Reed |
| 2003/0139938 A1 | 7/2003 | Meyers |
| 2003/0142133 A1 | 7/2003 | Brown et al. |
| 2003/0151605 A1 | 8/2003 | Dominici |
| 2004/0015549 A1 | 1/2004 | Saruhashi et al. |
| 2004/0030781 A1 | 2/2004 | Etesse et al. |
| 2004/0235564 A1 | 11/2004 | Booth |
| 2005/0026692 A1 | 2/2005 | Dyl |
| 2005/0044005 A1 | 2/2005 | Giannini |
| 2006/0089873 A1 | 4/2006 | Stewart, Jr. et al. |
| 2006/0119598 A1 | 6/2006 | Littlefield |
| 2006/0287072 A1 | 12/2006 | Walker et al. |
| 2007/0011273 A1 | 1/2007 | Greenstein et al. |
| 2007/0038559 A1 | 2/2007 | Jung et al. |
| 2007/0100937 A1 | 5/2007 | Burtner, IV et al. |
| 2007/0130339 A1 | 6/2007 | Alcorn et al. |
| 2007/0162547 A1 | 7/2007 | Ross |
| 2007/0202484 A1 | 8/2007 | Toombs et al. |
| 2007/0220090 A1 | 9/2007 | Hall |
| 2007/0224585 A1 | 9/2007 | Gerteis et al. |
| 2007/0238085 A1 | 10/2007 | Colvin et al. |
| 2007/0249323 A1 | 10/2007 | Lee et al. |
| 2007/0255805 A1 | 11/2007 | Beams et al. |
| 2008/0064018 A1 | 3/2008 | Griffin |
| 2008/0081701 A1 | 4/2008 | Shuster |
| 2008/0134056 A1 | 6/2008 | Shuster |
| 2008/0158232 A1 | 7/2008 | Shuster |

TIME-DEPENDENT CLIENT INACTIVITY INDICIA IN A MULTI-USER ANIMATION ENVIRONMENT

CROSS-REFERENCE TO RELATED APPLICATIONS

This application is a continuation of U.S. patent application Ser. No. 18/144,323, filed on May 8, 2023, which is a continuation of U.S. patent application Ser. No. 17/841,534, filed on Jun. 15, 2022, which is a continuation of U.S. patent application Ser. No. 17/223,204, filed on Apr. 6, 2021, which is a continuation of U.S. patent application Ser. No. 16/857,664, filed Apr. 24, 2020, which is a continuation of U.S. patent application Ser. No. 16/160,959, filed Oct. 15, 2018, which is a continuation of U.S. patent application Ser. No. 15/012,159, filed Feb. 1, 2016, which is a continuation of U.S. patent application Ser. No. 13/286,045, filed Oct. 31, 2011, which is a continuation of U.S. patent application Ser. No. 11/928,584, filed Oct. 30, 2007, which are all hereby incorporated herein by reference in their entireties.

FIELD

The field of the present invention relates to virtual computer-generated environments in which participants are represented by computer-generated avatars, and in particular for environments that simulate an actual 3-D environment and allow for simultaneous participation of multiple players.

BACKGROUND

Computer generated virtual environments are increasingly popular methods for people, both real and automated, to interact within a networked system. The creation of virtualized worlds, three dimensional or otherwise, is well known. Simple text based adventures such as "Zork", early "first person shooter" games such as "Doom", and ultimately numerous highly complex environments such as "Halo" are well known in the art. Various on-line environments are known in which a 3-D physical world (actual or fantasy) is simulated. Environments of this type are sometimes referred to as "virtual reality" or "virtual reality universe" (VRU) environments.

In known VRU environments, an actual or fantasy universe is simulated within a computer memory. Multiple players may participate in the environment through a computer network, such as a local area network or a wide area network. Each player selects an "avatar," which may comprise a three-dimensional figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated static objects, or avatars operated by other players.

The VRU may take the form of at least one area or environment which is a virtual-reality three-dimensional map existing in a computer memory, consisting of elements that may include but are not limited to representations of rooms, outdoor areas, exotic environments, objects, people, animals, robots, avatars, robot avatars, time elements, additional spatial elements, and activities. Users establish a presence in the VRU by creating or using an avatar, which is a three-dimensional representative of the user in the VRU, and which can be navigated by the user operating a remote client computer around various environments in the VRU. A view or views of the VRU are displayed to the user using a computer display and user interface software of the client as known in the art. Each user provides input commands to a computer controlling the VRU using an input device connected to a local node or client, which is in turn connected to the networked computer system. The VRU is shared by all players and participants, using elements from the common memory.

The computer system is used to control the action of the avatars in response to client input. For example, avatars may be limited to simply observing the environment or area. But usually, avatars can interact with some or all of: other avatars, objects, the environment (e.g., walls, floors, roads, lakes, etc.), and automated or robotic avatars within at least one environment. Interactions by one avatar with any other avatar, object, the environment or automated or robotic avatars may result in outcomes that may effect or can be otherwise observed or experienced by other avatars, objects, the environment, and automated or robotic avatars within the at least one environment of the VRU.

Typically, within VRU environments, when the client stops providing commands to direct the actions of the chosen avatar, the avatar ceases all affirmative action. In some environments, the avatar simply ceases all motion and movement. In other environments, the graphical representation of the avatar is pre-programmed to mimic an action a person might perform while waiting, such as tapping a foot or pacing. In some VRU environments, the avatar might continue to mimic the waiting action indefinitely. In others, following a predetermined amount of time for the inactivity, the VRU environment will automatically log the client out of the environment, making the avatar appear to suddenly vanish when viewed by other users within the environment.

SUMMARY

The present invention is directed toward a method for managing time-dependent client inactivity indicia in a multi-user virtual animation environment. A three-dimensional space within a computer memory is modeled, and an avatar of a client is located within the three-dimensional space. The avatar is graphically represented by a three-dimensional figure within the three-dimensional space and is responsive to client input commands. The three-dimensional figure of the avatar includes a graphical representation of client activity. Client input commands for the avatar are monitored to determine client activity. The client input commands are monitored to determine client activity. The graphical representation of client activity is then altered according to an inactivity scheme when client input commands are not detected. Following a predetermined period of client inactivity, the inactivity scheme varies non-repetitively with time. Preferably, the inactivity scheme includes an algorithm for altering a transparency of the three-dimensional figure over time. Transparency indicates a degree to which a graphical representation of the avatar occludes background objects displayed on a display screen of a client terminal. For example, a 50% transparent avatar means that 50% of pixel values are taken from rendering the avatar and 50% from rendering background areas of the environment that would be otherwise obscured by the avatar.

Accordingly, a method for managing time-dependent client inactivity indicia in a multi-user virtual animation environment is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION

Figure 1:
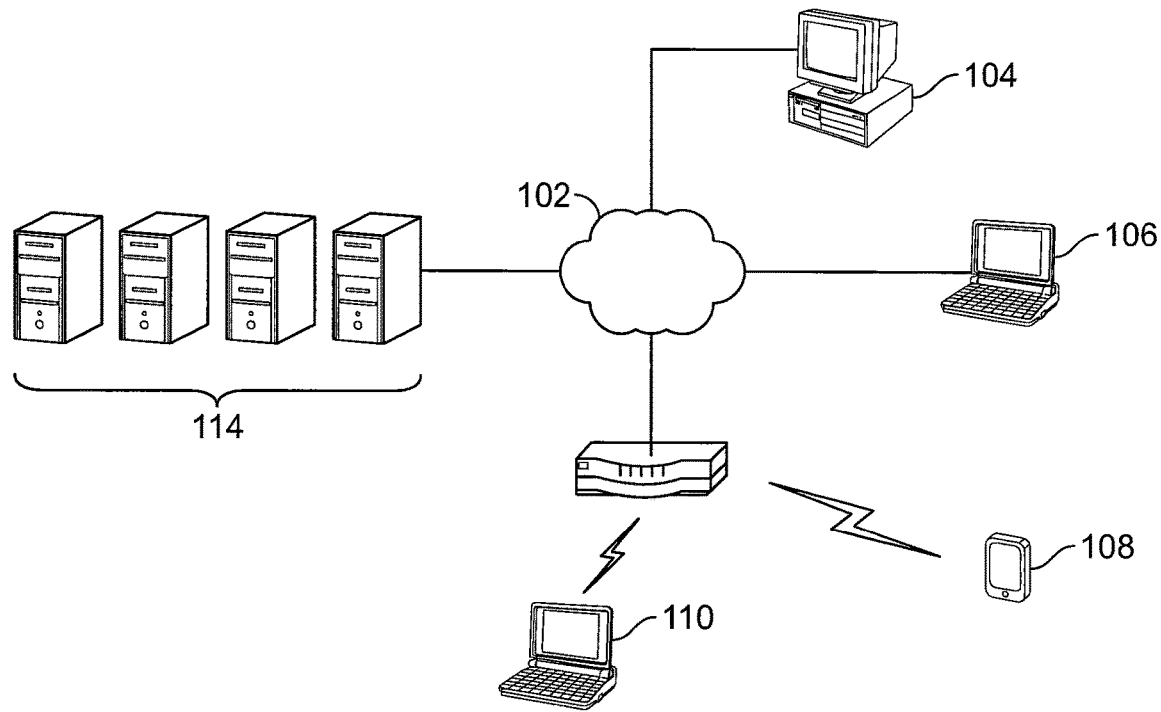
FIG. 1 is a schematic diagram showing a first system for implementing a multi-user animation environment.

A system for providing a VRU to multiple users may comprise any number of client sites, nodes, or terminals. As shown in FIG. 1, the system 100 includes a personal computer 104, two portable computers 106, 110, a digital assistant 108 (which may also be in the form of a compact player, cell phone, or similar hand held device), and a router 112 communicating via a wide area network (WAN) 102 to one or more servers 114. The servers 114 store and serve VRU data and software to the client sites. Software or firmware may also be located at each client site, configured to work cooperatively with software or firmware operating on servers 114. Generally, any number of clients may be communicating with servers 114 for participation in the VRU at any given time.

Figure 2:
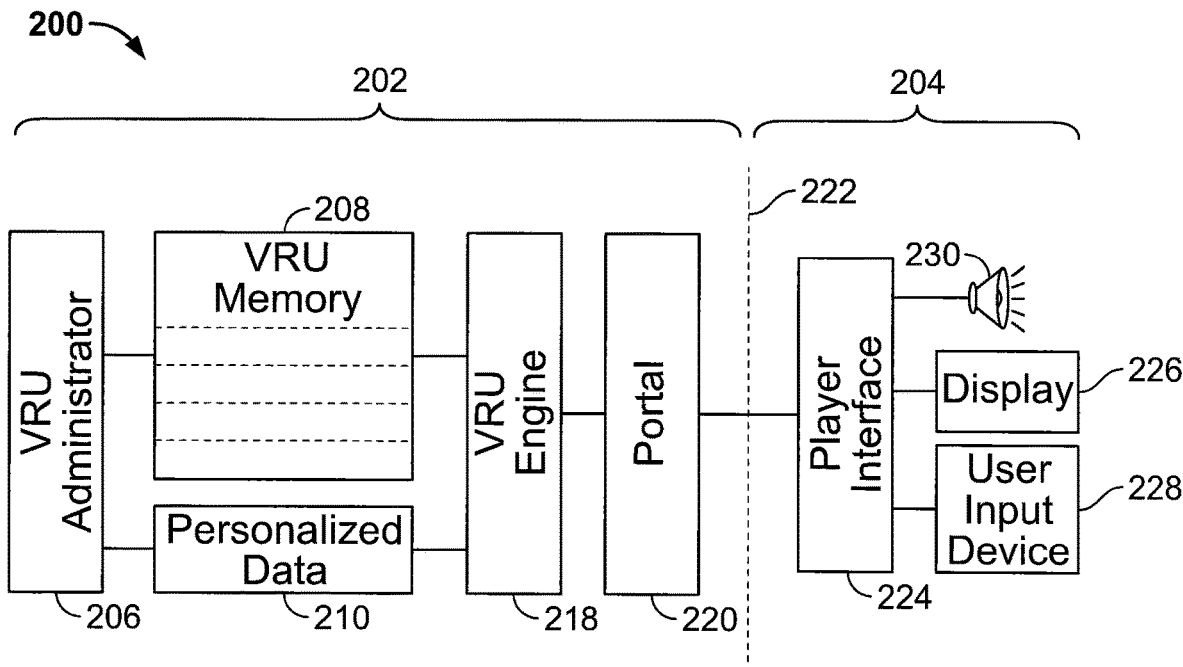
FIG. 2 is a schematic diagram showing a second system for implementing a multi-user animation environment.

Referring to FIG. 2, a system 200 for providing a VRU includes server-side components 202 (to the left of dashed line 222) and client-side components 204 (to the right of dashed line 222). The server-side components 202 include a portal 220 for managing connections to multiple simultaneous players. The portal 220 interacts with a VRU engine 218, passing user input from multiple clients/players to the VRU engine 218, and passing data from the VRU engine 218 to respective individual players. The VRU engine 218 is operatively associated with various memory spaces 208, and a personalized or common data space 210. As known in the art, objects in a VRU are modeled as three-dimensional objects, or two-dimensional objects, having a defined location, orientation, surface, surface texture, and other properties for graphic rendering or game behavior. The memory spaces 208 hold active or inactive instances of defined spaces used in the VRU environment. The personalized space 210 may include various different personal areas each assigned to a different client, for example, avatar or avatar accessories data. As an alternative the memory spaces 208 may be further segmented and the personalized space 210 may be incorporated therein. The VRU engine 218 may operate with other memory areas not shown in FIG. 2, for example various data libraries, archives, and records not inconsistent with the methods and systems disclosed herein. The server side components 218 may be implemented differently than described herein, as the skilled artisan will recognize that different design choices may be made to achieve similar results.

With such a configuration, users may customize their avatars to have an appearance and qualities specified by each user. Customization may include choice of avatar character, features, clothing, and/or accessories from an online catalog or store. The particular arrangement selected by a user may reside in the personalized space 210 associate with the particular user, specifying which avatar elements are to be drawn from a common space to construct the avatar as designed by the user. Alternatively, the entire customized avatar instance may be stored in the personalized space for the user. In another alternative, or in addition, a user may own customized elements of an avatar, including clothing, accessories, simulated physical powers, etc., that are stored solely in the personalized space and are not available to other users. Avatars may move and interact both with common elements and personalized elements.

A separate administration module 206 may operate at the server level to create, update, modify or otherwise control the content of the VRU as defined in the memory areas 208. Generally, changes in the personal space 210 are driven by individual users, either through the VRU administrator 206 or another module. Control of common areas, i.e., the game environment and the objects in it, are made via the administrator module 206.

At the client level, a player interface module 224 is installed to receive player inputs from one or more user input devices 228, such as a keyboard, mouse, pointer, or microphone, and provide data to the VRU engine 218 via the portal 222 in response to the input. The player interface module may also receive game data from the portal 220 and process the data for display on the display 226 and for audio output on the speaker 230. Various systems and methods for providing a three-dimensional, multiplayer interactive animation to multiple players are known in the art, or may be adapted by one of ordinary skill for use with the invention. For example, rendering of a scene may be performed at the client or server level. Generally, it may be advantageous to perform calculations and graphics operations, to the extent possible, at the client level, thereby freeing up network bandwidth and minimizing loads on the server. The invention is not limited to a particular hardware or software architecture for carrying out the steps described herein.

As part of the VRU environment, each user's avatar is associated with a graphical representation of client activity. This graphical representation may take any form which provides visual cues as to the activity status of the client of any given avatar. Such visual cues inform other users within the VRU environment that the client of a particular avatar is active or inactive, and as described in more detail below, may be used to provide other users with an estimate of the length of time a particular client has been inactive. For example, when the avatar is actively receiving input commands from the client, the graphical representation may be the action of the avatar acting out the input commands. Alternatively, an active avatar may display a badge indicating the active status of the client, or the avatar may be displayed without transparency. Essentially, the form that the graphical representation of client activity, or inactivity, takes is a matter of design choice. Then, when the avatar becomes inactive, the graphical representation of client activity changes according to an inactivity scheme to indicate client inactivity. The inactivity scheme may have a single segment which includes non-repetitive changes to the graphical representation of client activity as a visual cue to indicate how long the client has been inactive. Alternatively, the inactivity scheme may be divided into multiple segments, each segment using different changes to the graphical representation of client activity, to provide more accurate information about how long the client has been inactive.

Figure 3:
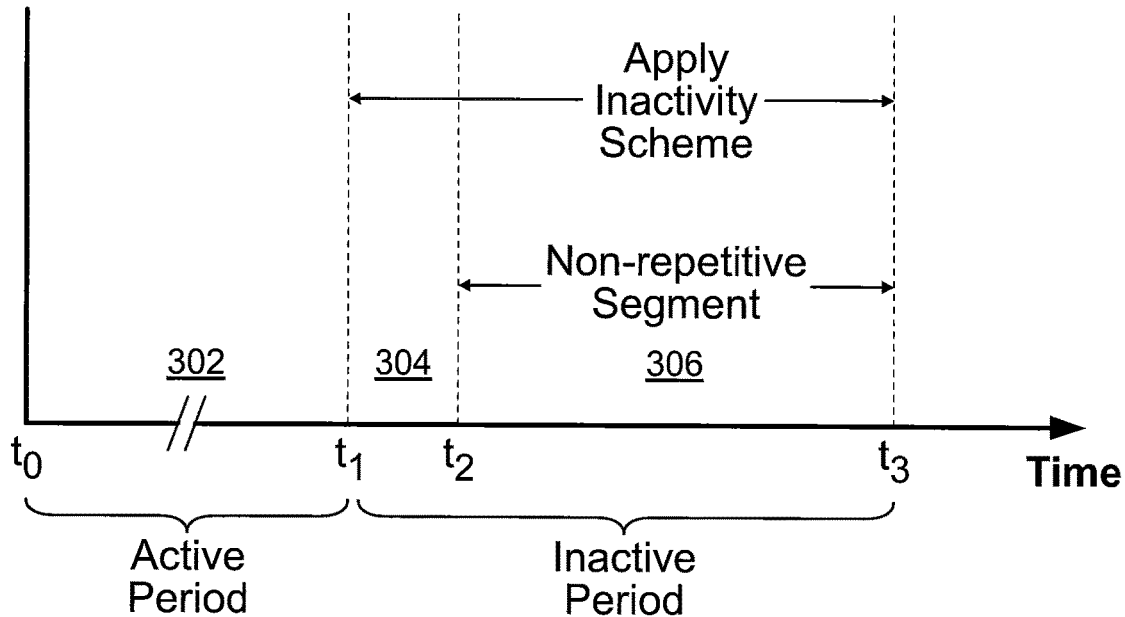
FIG. 3 is a timeline diagram showing periods of activity and inactivity for an avatar within a multi-user animation environment.

FIG. 3 shows a timeline 300 illustrating the active and inactive periods for a client and that client's avatar. Client activity may be monitored either by the VRU engine, or by the player interface. The timeline 300 is broken into three segments, with the first segment 302 being the period of time, between t0 and t1, during which the client is active, i.e., the player interface is actively receiving input commands from the client. The actual time between to and t1 is entirely arbitrary and depends upon client interaction with the player interface and VRU engine. On the timeline 300, time t1 is the time at which the VRU system determines that the client is inactive. Client activity is defined as receiving at least one input command per command cycle, with each command cycle being a short period of time which is set according to design choice. For example, a command cycle may be as little as 0.5 seconds or less, or as much as 10 seconds or more. Thus, if the command cycle is set at 5 seconds and an input command is not received during any one command cycle, then the system will identify the client as inactive. If any input commands are received when the client is identified as inactive, then the system once again recognizes the client as being active. As indicated above, during this first segment, the graphical representation of client activity is the action of the avatar acting out the input commands.

The second timeline segment 304, between t1 and t2, begins implementation of the inactivity scheme. At time t1, they VRU system identifies the client as being inactive during a single command cycle. During the entire second timeline segment, the client is identified as inactive by the VRU system. The inactivity scheme is carried out during the second segment 304 and through the third segment 306 as alterations to the graphical representation of client activity, so long as the client remains inactive. If at any time during the second timeline segment 304 or third timeline segment 306, the client input commands are received for the avatar, then the timeline is reset to, and the monitoring of client activity begins again.

During the second segment 304, the graphical representation of client activity is preferably exemplified by the avatar mimicking a waiting action, e.g., tapping its toes, pacing, scratching its head, and the like, as the system waits for additional input commands from the client. The mimicking of a waiting action is a change to the graphical representation of client activity as compared to how the avatar graphically appeared during the first timeline segment 302.

The actual time between t1 and t2 is predetermined and based upon design choice. After time t2, the third timeline segment 306 begins, and continues between times t2 and t3. During this third timeline segment 306, the graphical representation of client activity is altered non-repetitively with time. For example, while the tapping toes, pacing, and head scratching is repetitive action and may continue, a non-repetitive change is introduced to the alterations being made to the graphical representation of client activity.

A suitable non-repetitive alteration may comprise a change in the overall transparency of the three-dimensional figure representing the avatar. Other non-repetitive alterations may be introduced in place of, or in addition to, changes in the transparency of the three-dimensional figure, as a matter of design choice. In the case of changes to the transparency, the three-dimensional figure will generally have an assigned transparency value during regular activities within the VRU environment. During this third timeline segment 306, the predefined transparency value may be linearly, or non-linearly, changed over time in a non-repetitive and non-cyclical manner. Such linear or non-linear changes may be made according to a predetermined algorithm incorporated into one of the VRU engine or the player interface. By making changes to the graphical representation of client activity in this manner, other users can readily estimate the length of time since an inactive avatar actively received input commands from its client.

At the end of the third timeline segment 306, at time t3, the inactive avatar may be removed entirely from the VRU environment, or it may be relocated to a home or safe location that is reserved expressly for inactive avatars. The time between t2 and t3 is predetermined and based upon design choice. Should the user once again desire to resume activities, the user can direct the avatar to either reenter the VRU or simply leave the home location, thereby allowing the user to resume interaction within the VRU environment.

Varying transparency of an avatar or other modeled object in a VRU environment may be accomplished in various ways. It should be remembered, however, that bandwidth and computational limits coupled with the need to maintain near real time responsiveness of the multi-user animation taking place in the VRU environment may constrain rendering methods. It may therefore be desirable to vary transparency in a manner that does not require ray tracing of a modeled three-dimensional environment that includes modeled solids of varying transparency. Such a brute force computational force would be unduly slow and cumbersome for present network and computational resources used by most consumers. The effect of partial transparency may be more efficiently modeled using a two-dimensional map or projection of the modeled environment.

Figure 4:
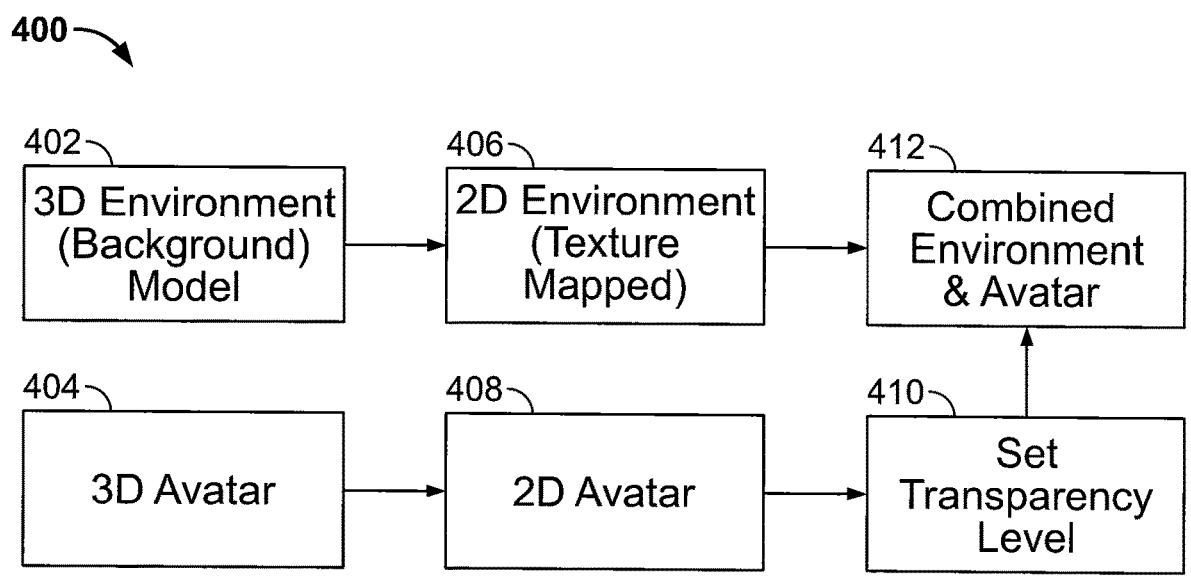
FIG. 4 is a flow diagram showing exemplary steps of a processing method for creating a varying transparency in a VRU environment.

FIG. 4 illustrates an exemplary processing method 400 for creating a varying transparency in a VRU environment. At the host level, a VRU compilation process collects transient data needed for generating client views of the environment and distributes this data to respective remote clients. Each client may receive only that data needed for providing a rendered view personalized for the client. The transient data may comprise geometric data concerning moving objects in a particular scene, especially positions and orientations of avatars in a scene. Data for movable modeled objects may also be included in the transient data. In this example, the client retains data for immovable background objects.

Once the data is received, each client may begin processing the transient data to develop a three-dimensional model of the scene. This model may comprise an environmental model 402 of the background and an avatars model 404 of the avatars in the scene. The models 402, 404 describe the positions and orientations of the objects making up the VRU environment and avatars in them.

The client then performs an efficient perspective projection of the models 402, 404 to obtain respective environmental projection 406 and avatar projection 408. Coloration of the projections may be determined using texture mapping. Bump mapping may also be used for greater realism if sufficient computational resources are available. The environmental projection 406 may therefore comprise a two-dimensional map of the 30 environmental model 402 using a perspective projection. The avatar projection may comprise a two-dimensional map of avatars positioned in the environment according to the same perspective projection. The client may also maintain a record for aligning the two projections and determining a background/foreground hierarchy to determine which parts of the projections should remain in front in a combined projection.

Pixel transparency of the two-dimensional avatar projection may then be set somewhere in the range between 0% to 100%, with 0% corresponding to normal (opaque) and 100% transparent to no coloration (invisible). The degree of transparency may be set according to time since last avatar activity, as described elsewhere herein. The client may measure activity from changes in avatar position or orientation, but more preferably, periodically receives an indicator from the host setting current transparency values for avatar in the scene. The host may determine transparency values based on time since any input is received from each client associated with an avatar, regardless of avatar movement. For example, if an avatar is still while its client engages in a chat activity, the avatar may be considered active even if it is not being moved in response to client commands.

After the transparency is set to a determined value for each avatar, the two-dimensional projections of the environment and the avatars may be combined according to the perspective of a selected viewpoint to prepare a combined projection 412. Where pixel values from different projections overlap, pixels in the combined projection may be set according to which pixel is nearer the foreground. Determination of relative position of overlapping objects may be computed during projection and maintained using a hierarchical ordering. If a foreground pixel has a transparency value greater than 0%, the corresponding pixel may take on the coloring of the more distant pixel to a degree determined by the transparency setting. For example, a 50% transparent object may be displayed by averaging the color values of the foreground and background pixels, or in the alternative, by displaying every other foreground pixel alternating with a background pixel.

Figure 5:
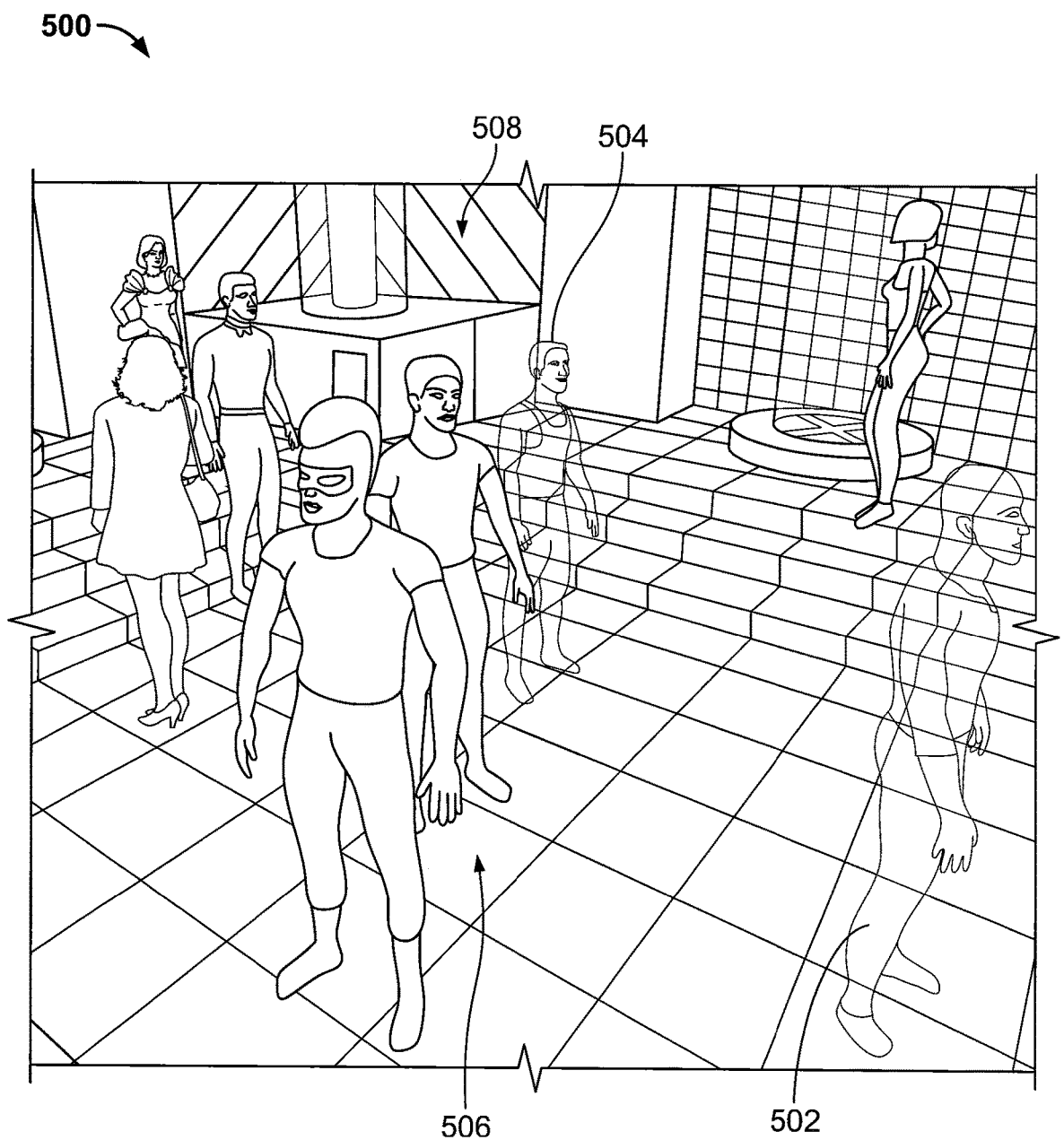
FIG. 5 is a screenshot showing exemplary output from the method for creating a varying transparency in a VRU environment.

An exemplary effect of the foregoing process in shown in FIG. 5, depicting an exemplary screenshot 500. The screenshot includes a view of a background environment 508, non-transparent avatars 506 and transparent avatars 502, 504. The transparency of avatars 502, 504 is determined in accordance with a time-dependent measure of client inactivity. Pixel coloration from the environment 508 is apparent within the outline of the partially transparent avatars 502, 504. Hence, all clients receiving this view are alerted to inactivity by clients controlling those avatars.

Thus, an improved method for managing time-dependent client inactivity indicia in a multi-user virtual animation environment is disclosed. While embodiments of this invention have been shown and described, it will be apparent to those skilled in the art that many more modifications are possible without departing from the inventive concepts herein. The invention, therefore, is not to be restricted except as defined by the following claims.

What is claimed is:

1. A method comprising:
   modeling a three-dimensional space within a computer memory;
   locating an avatar within the three-dimensional space at a first location, the avatar being responsive to input commands from a first client to act within the three-dimensional space;
   monitoring avatar activity to determine a period of time since a last avatar activity;
   in response to the period of time being greater than a first threshold, repetitively changing an appearance of the avatar; and
   in response to the period of time being greater than a second threshold larger than the first threshold, non-repetitively changing the appearance of the avatar.

2. The method of claim 1, wherein the avatar activity includes activities which move the avatar within the three-dimensional space and activities which do not move the avatar in the three-dimensional space.

3. The method of claim 1, wherein repetitively changing the appearance of the avatar includes causing the avatar to perform a repetitive action.

4. The method of claim 3, wherein the repetitive action includes at least one of toe tapping, head scratching, or pacing.

5. The method of claim 3, wherein the repetitive action includes moving between the first location and a second location.

6. The method of claim 3, wherein non-repetitively changing the appearance of the avatar includes continuing to cause the avatar to perform the repetitive action.

7. The method of claim 1, wherein non-repetitively changing the appearance of the avatar includes continuously changing a property of the appearance of the avatar over a time period.

8. The method of claim 1, wherein non-repetitively changing the appearance of the avatar includes changing a transparency of at least a portion of the avatar.

9. The method of claim 1, further comprising:
   in response to the period of time being greater than a third threshold larger than the second threshold, removing the avatar from the three-dimensional space.

10. The method of claim 1, further comprising:
    in response to the period of time being greater than a third threshold larger than the second threshold, relocating the avatar from the first location to a second location.

11. The method of claim 1, further comprising:
    moving the avatar from the first location to a second location based on user commands;
    in response to the period of time being greater than the first threshold, repetitively moving the avatar between the second location and a third location; and
    in response to the period of time being greater than the second threshold, non-repetitively moving the avatar to a fourth location.

12. The method of claim 1, further comprising transmitting, to a second client, an indication of the appearance of the avatar.

13. A system comprising:
    a memory; and
    one or more processors to:
    model a three-dimensional space within a computer memory;
    locate an avatar within the three-dimensional space at a first location, the avatar being responsive to input commands from a first client to act within the three-dimensional space;
    monitor avatar activity to determine a period of time since a last avatar activity;
    in response to the period of time being greater than a first threshold, repetitively change an appearance of the avatar; and
    in response to the period of time being greater than a second threshold larger than the first threshold, non-repetitively change the appearance of the avatar.

14. The system of claim 13, wherein the one or more processors repetitively change the appearance of the avatar by causing the avatar to perform a repetitive action.

15. The system of claim 14, wherein the repetitive action includes at least one of toe tapping, head scratching, or pacing.

16. The system of claim 14, wherein the repetitive action includes moving between the first location and a second location.

17. The system of claim 14, wherein non-repetitively changing the appearance of the avatar includes continuing to cause the avatar to perform the repetitive action.

18. The system of claim 13, wherein non-repetitively changing the appearance of the avatar includes continuously changing a property of the appearance of the avatar over a time period.

19. The method of claim 13, wherein non-repetitively changing the appearance of the avatar includes changing a transparency of at least a portion of the avatar.

20. A non-transitory computer memory including instructions which, when executed by one or more processors of a first client including a display, cause the first client to:
   model a three-dimensional space within a computer memory;
   locate an avatar within the three-dimensional space at a first location, the avatar being responsive to input commands from a first client to act within the three-dimensional space;
   monitor avatar activity to determine a period of time since a last avatar activity;
   in response to the period of time being greater than a first threshold, repetitively change an appearance of the avatar; and
   in response to the period of time being greater than a second threshold larger than the first threshold, non-repetitively change the appearance of the avatar.

* * * * *